Figure 1:
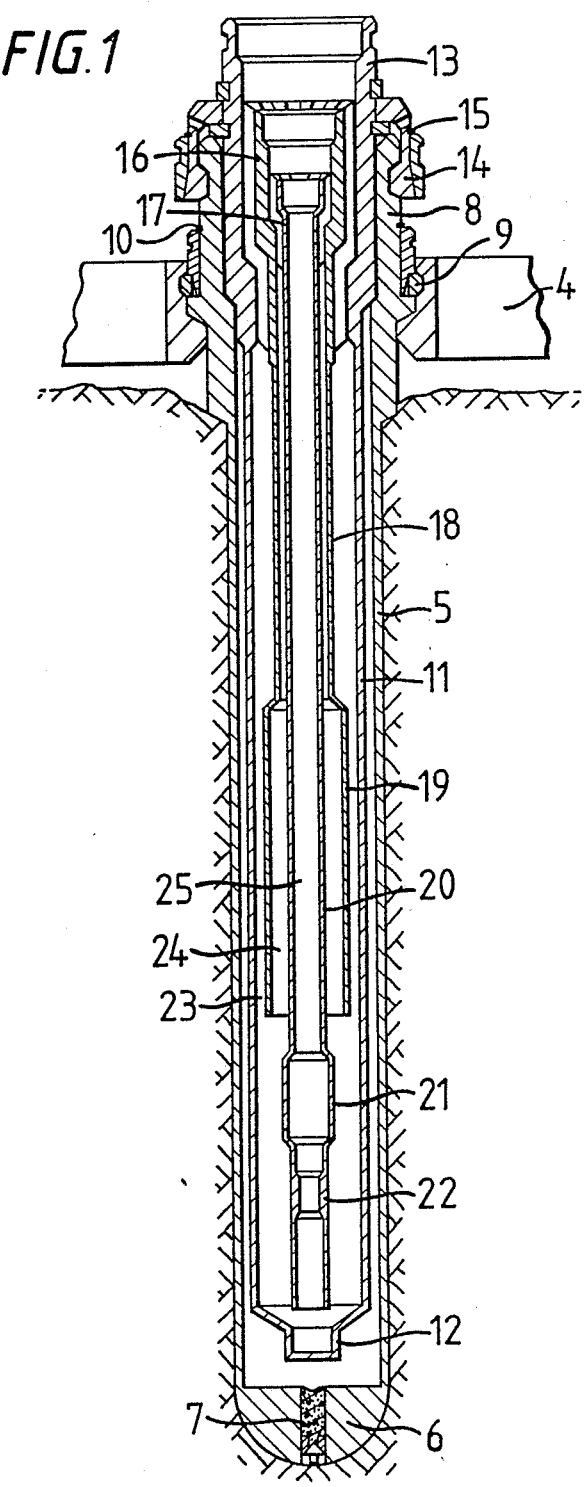

United States Patent [19]

Dean et al.

[11] Patent Number: 4,900,433
[45] Date of Patent: Feb. 13, 1990

[54] VERTICAL OIL SEPARATOR

[75] Inventors: Alan J. Dean, Skene; Hans P. Hopper, Whiterashes, both of Scotland

[73] Assignee: The British Petroleum Company p.l.c., London, United Kingdom

[21] Appl. No.: 173,332

[22] Filed: Mar. 23, 1988

[30] Foreign Application Priority Data

Mar. 26, 1987 [GB] United Kingdom ................. 8707306

[51] Int. Cl.$^4$ ............................................ B01D 45/02
[52] U.S. Cl. .................... 210/170; 210/188; 210/194; 210/416.5; 210/512.1; 210/512.3; 166/105.5; 166/357
[58] Field of Search .................. 210/170, 416.1, 512.1, 210/519, 522, 787, 788, 802, 800, 188, 194; 55/52, 159, 199, 203, 204; 166/105.5, 356, 265, 357; 422/181, 218, 236; 417/410

[56] References Cited

U.S. PATENT DOCUMENTS

| | | | |
|---|---|---|---|
| 2,429,043 | 10/1947 | Barnhart | 166/105.5 |
| 3,893,918 | 7/1975 | Favret, Jr. | 210/800 |
| 4,273,472 | 6/1981 | Piazza et al. | 166/356 |
| 4,330,306 | 5/1982 | Salant | 210/188 |
| 4,386,654 | 6/1983 | Becker | 166/105.5 |
| 4,626,360 | 12/1986 | Senyard et al. | 210/802 |
| 4,676,308 | 6/1987 | Chow et al. | 210/188 |
| 4,718,824 | 1/1988 | Cholet et al. | 417/410 |

OTHER PUBLICATIONS

J. S. Horne et al., "Development of a Marginal Property: Petronella Field", *SPE European Petroleum Conference Paper No. SPE* 15893, Oct. 20–22, 1986.

*Primary Examiner*—Richard V. Fisher
*Assistant Examiner*—Joseph Drudge
*Attorney, Agent, or Firm*—Larry W. Evans; David J. Untener; Michael F. Esposito

[57] ABSTRACT

A vertical separator for separating crude oil into liquid and gas phases composed of an outer casing and two further sets of concentric tubing to enclose two annuli and a central passage, one annulus having an inlet to receive crude oil, the other annulus having an outlet for separated gas, each at the top of the separator. The central passage collects produced oil with a pump near its base and a pump drive pipe extending up it. The crude oil may flow down its annulus with a swirling motion which can be induced and assisted by a tangential inlet, and/or a cyclone at the top, and one or more helices in the annulus. The separator may be used for underwater wells and may extend partially or wholly into the sea bed with a protective cemented external casing around it.

6 Claims, 6 Drawing Sheets

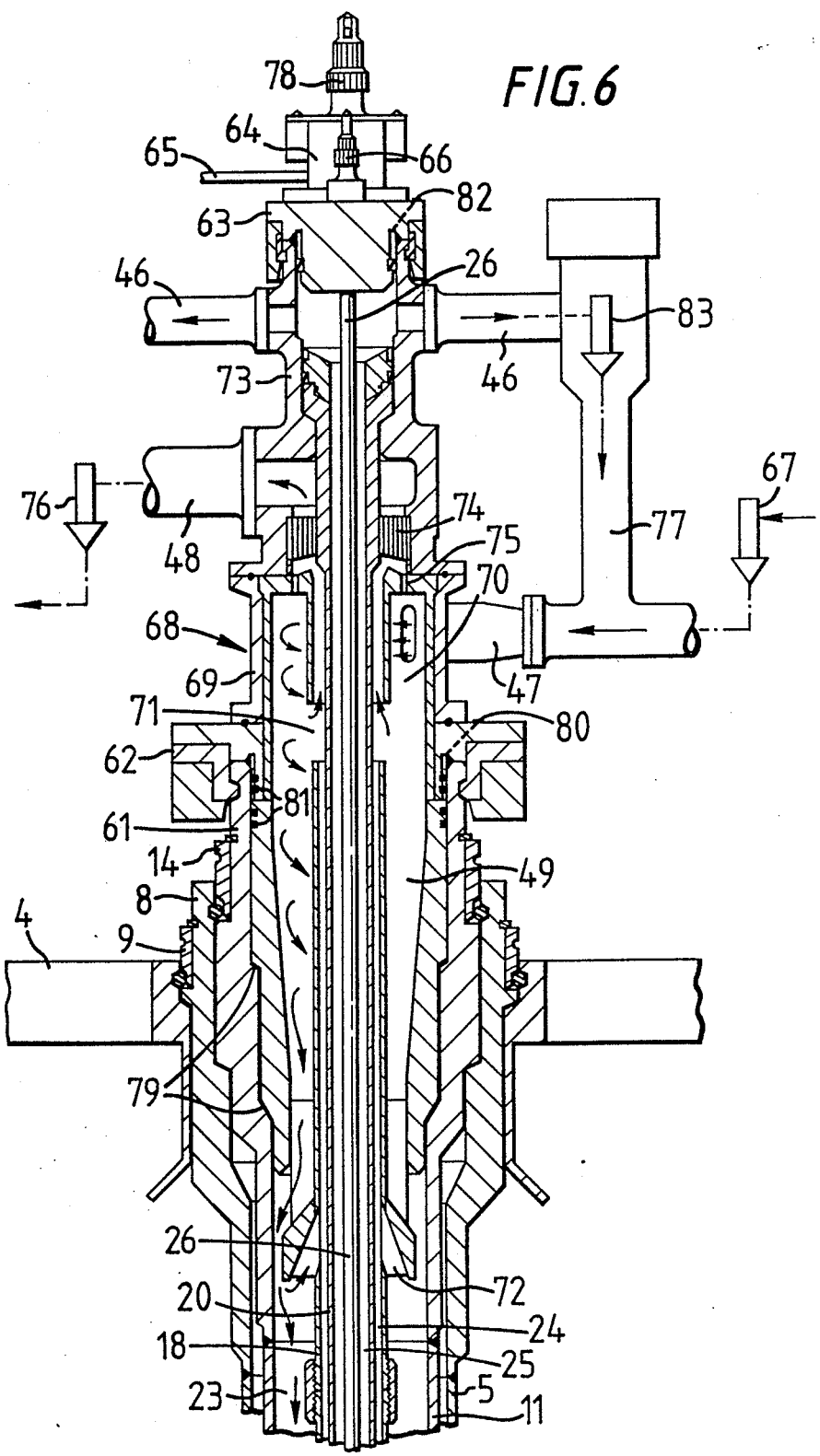

VERTICAL OIL SEPARATOR

This invention relates to a vertical separator for separating crude oil and associated gas into its liquid and gas phases. It relates particularly to a vertical separator for an underwater oilfield and more particularly an underwater oilfield separator drilled into the sea bed so that crude oil can be separated into oil (plus any produced water) and gas phases underwater. It can be described as a Vertical Annulus Separation and Pumping System.

In the present state of technology for producing oil from underwater wells, oil production well heads can and have been positioned on the sea bed. However, the produced oil from these underwater well-heads has to be brought to the water surface to be processed on fixed or floating platforms. Such processing includes separation of associated gas from the oil and separate despatch of the oil and gas. Other possible processing requirements include water injection to maintain well productivity (so-called "secondary recovery"), injection of artificial lift fluid to encourage oil production and chemical fluid injection into the oil.

Fixed or floating platforms carrying this processing equipment are necessarily large, heavy and expensive. As the water depths from which oil is produced become greater so the size of fixed platforms increases and there is a practical limit to the water depth in which a fixed platform can be placed. Theoretically, floating platforms are not so limited and could process oil produced from any water depth. However, they have to be kept on station by mooring lines, tethers and/or thrusters and, as water depths increase, so does the severity of sea and weather conditions that the platforms have to be designed to withstand. In practice, therefore the cost and size of floating platforms also tend to increase as water depth increases.

Part of the bulk and cost of fixed or floating platforms comes from the need to have separators on them. Separators on platforms are normally relatively large horizontal separators. If the separation of the crude oil into oil and gas phases could be carried out underwater, then the platform size and cost could be reduced considerably, even if it was still felt necessary to have a platform for operating and controlling other aspects of underwater well management, such as the dispatch of the separated oil and gas phases, water injection and the injection of chemical or artificial lift fluids.

However, the ultimate prize is underwater crude oil separation and pumping that would eliminate platforms altogether. This would then allow crude oil production from underwater wells to be independent of local fixed or floating platforms. The specification of UK Patent Application No. 8707307 (equivalent to U.S. Ser. No. 07/173,330) filed simultaneously with this application describes such a sea bed process complex where all underwater well management functions are within the complex. The complex includes an underwater separator, and the present invention is particularly suitable for use in the sea bed process complex of UK Patent Application No. 8707307. Its use, however, is not so limited. It could be used in combination with a fixed or floating platform as indicated above or with any other surface or underwater well management system.

According to the present invention a vertical separator for separating crude oil into oil and gas phases comprises:

(i) an outer casing forming the outer shell of the separator,
(ii) two further sets of concentric tubing within the outer casing, giving with the outer casing, two annuli and a central passage, one annulus being adapted to receive crude oil, the other to collect separated gas and the central passage to collect produced oil, and
(iii) a pump near the base of the separator and a pump drive pipe extending up within the central passage.

Preferably, the crude oil inlet and the separated gas and produced oil outlets are at the top of the separator.

In a preferred embodiment, the separator may be for an underwater well, may extend at least partially into the sea bed and may have an external casing, outside the separator outer casing, which is cemented into the sea bed.

If the separator is to be used in association with an underwater oilfield system not associated with a local platform, then the separator should be substantially wholly within the seabed. Even if there is an associated local platform this may still be the case. If there is an associated local platform the separator may, alternatively, be only partially within the seabed with its upper portion above the seabed and forming in effect a riser for bringing the oil from the seabed to platform deck level.

If there is an associated local platform, it would be possible, however, to have the separator resting on the sea bed or even above the sea bed as part of the platform equipment.

In a particular preferred embodiment, the annulus which receives the crude oil may have means for applying a swirling motion to the crude oil. This may be a tangential inlet for the crude oil and/or a cyclone. Separately, or in addition, there may be one or more helices in the crude oil annulus to sustain the vortex. The helix or helices may be of varying pitch along their length. With a number of helices, varying slope helices can give the crude oil alternating areas of stronger and weaker vortices to help to sustain the vortex throughout the vertical length of the separator.

Preferably, in a separator with one or more helices, the crude oil annulus is the outermost annulus but it would be possible to envisage helices within the inner of the two annuli.

Figure 2:
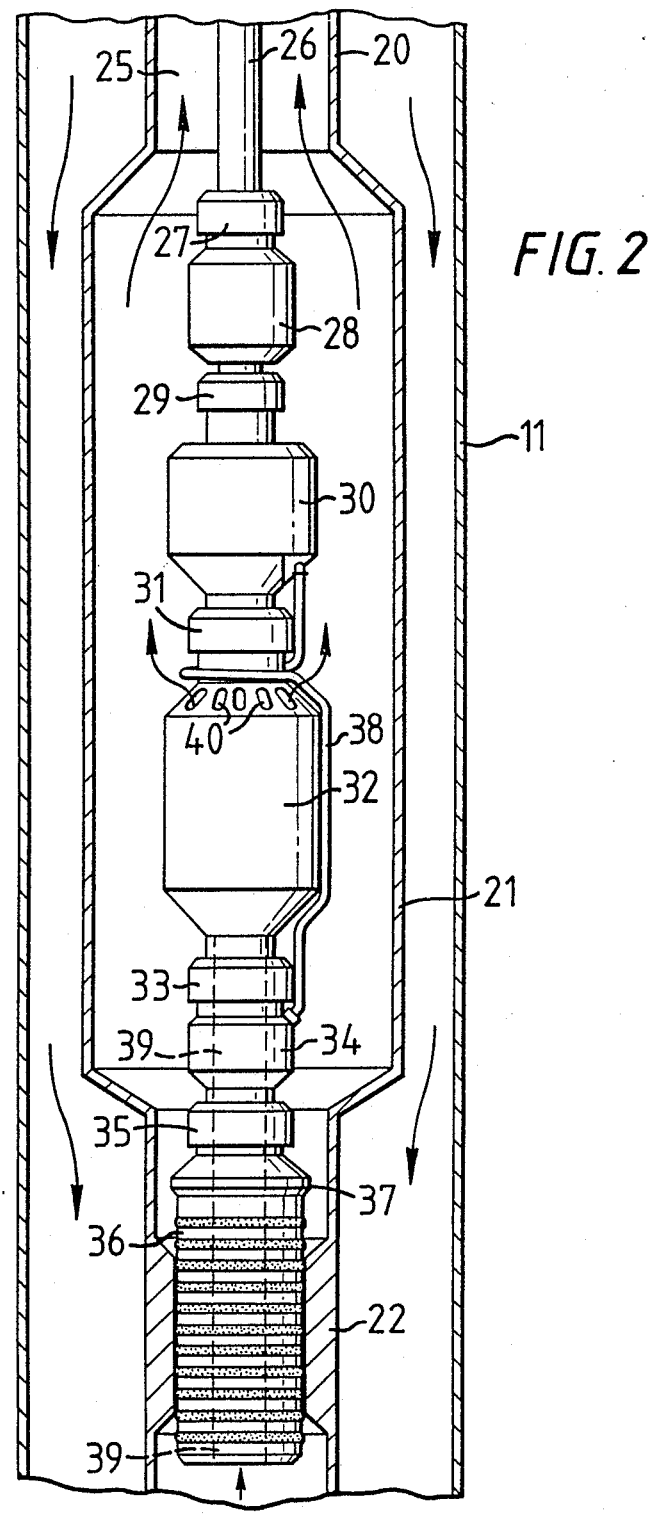
Figure 3:
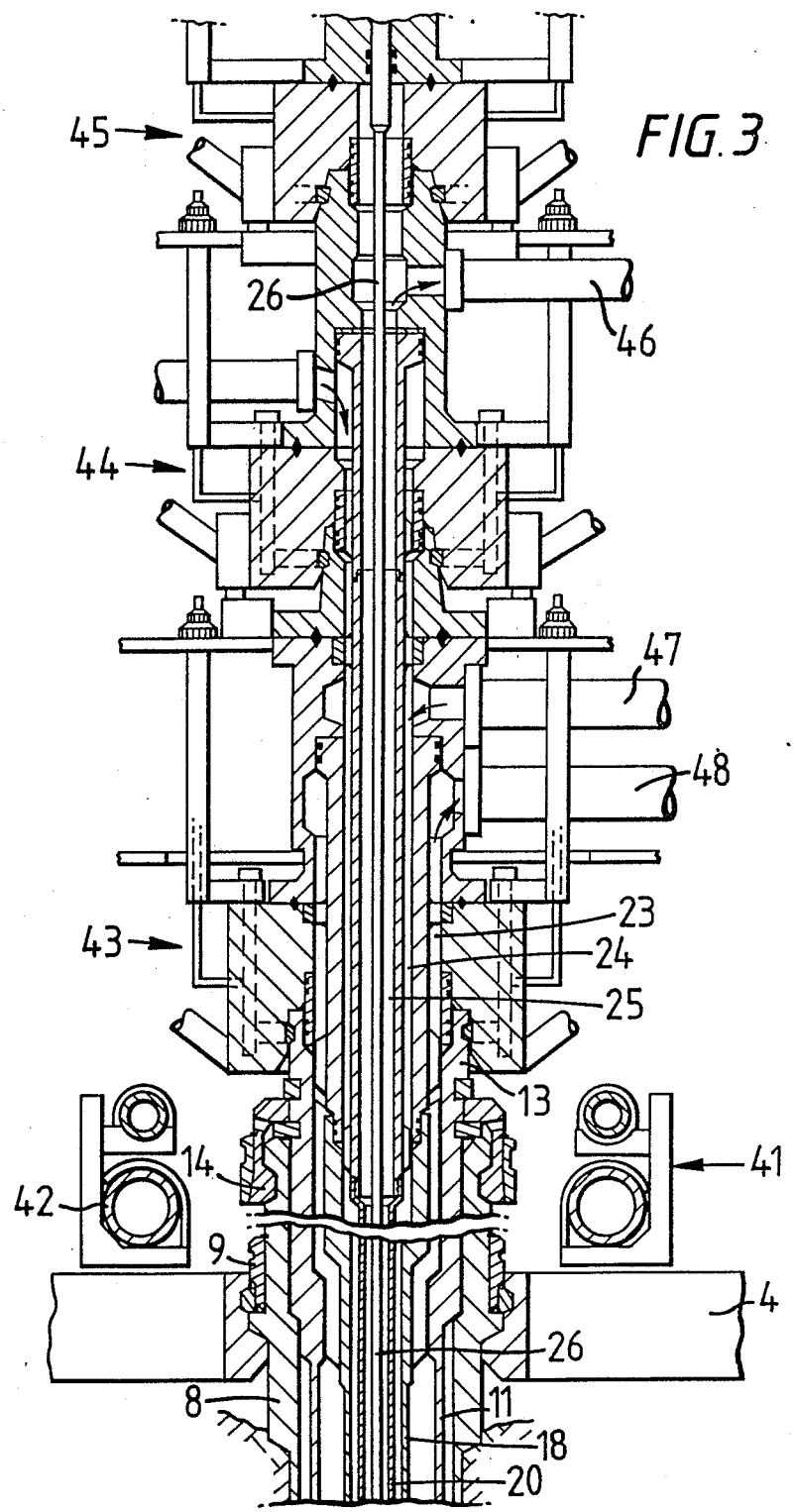

The invention is further described and illustrated with reference to the accompanying drawings in which FIG. 1 is a section through a separator according to the present invention, FIG. 2 is a section through the base of the separator of FIG. 1 in the area of the pump, FIG. 3 is a section through the separator head, showing the inlet and outlet lines for the separator.

Figure 4:
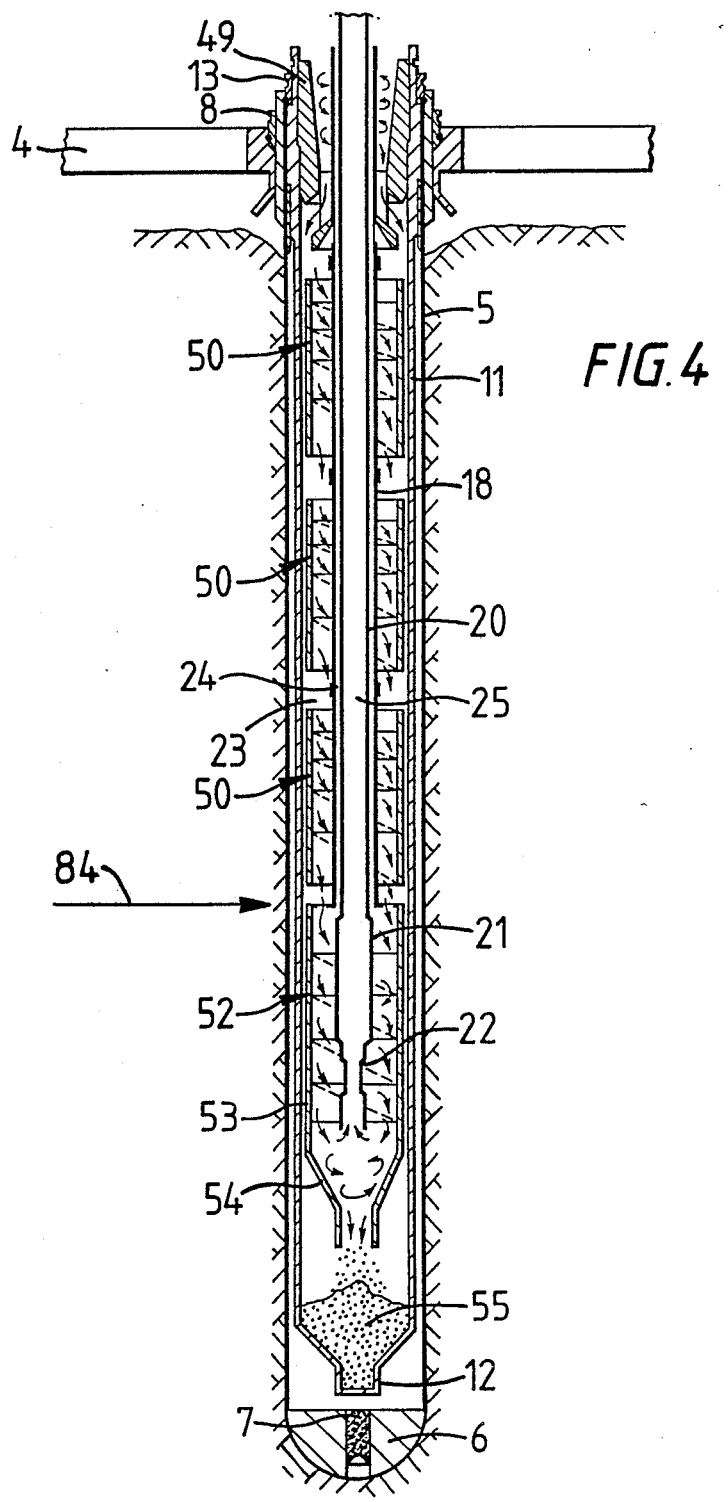
Figure 5:
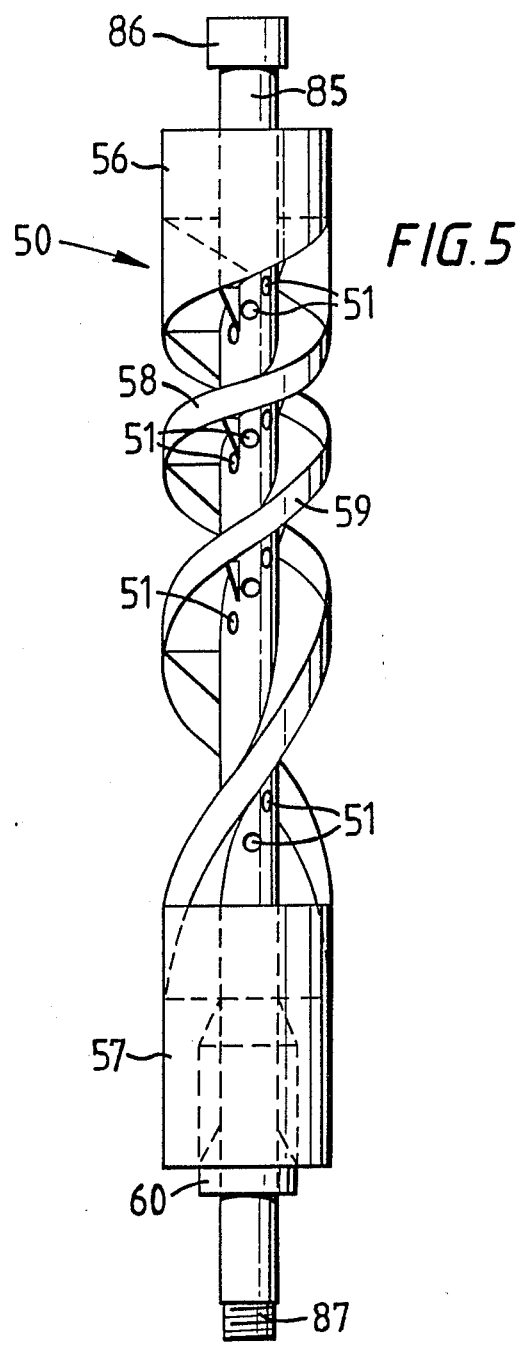

FIG. 4 is a section through another form of separator according to the present invention, FIG. 5 is a view of a helix for use in the separator of FIG. 4, and FIG. 6 is a section through the separator head of the separator of FIG. 4.

The separator of the present invention may be formed in exactly the same way as, or in a similar way to, an underwater well. Thus FIG. 1 shows a typical example of the invention using standard drilling sizes. There is a template framework 4 on the sea bed. A hole is drilled through this framework into the sea bed using a conventional drill bit and string and a 30 inch conductor 5 is run and cemented into the hole. The bottom of this conductor 5 has a conductor shoe 6 with a cement plug 7 to seal it. The top of the conductor 5 is held by a housing 8 locked into the template framework by a lock down ring 9 and a spring shear ring 10.

Within this external conductor 5 and housing 8, a 26 inch outer casing 11 is run. This casing 11 is sealed at its base with a casing sump 12 and is suspended from a wellhead 13 (18¾ inch in this example) which is locked within housing 8 by a lockdown ring 14 and spring shear ring 15. This outer casing 11 forms the outer shell of the separator, the cemented external conductor 5 being just a protection for the separator. It would not be safe to use external conductor 5 as the outer shell of the separator as there could be corrosion or leakage through it. Also, the use of an external conductor allows the outer casing 11 to be changed and replaced if required without the need for further drilling or cementing.

Within well head 13 are hangers 16,17 for 10¾ inch and 8⅝ inch production tubing. This can be normal oil well production tubing. The 10¾ inch outer tubing 18 extends only part of the way down the separator. At its base it widens out into 11¾ inch tubing 19. The 8⅝ inch inner tubing 20 extends down beyond the end of the outer tubing 18 nearly to the base of the separator and has near its base an enlargement 21 to hold a pump (see FIG. 2) and a neck 22 to form a bore for holding a pump support (see FIG. 2).

It will be seen that this assembly of casing and tubing gives, within the outer casing 11 of the separator, two annuli 23,24 and a central passage 25.

The dimensions of the various casings and tubings are merely illustrative and represent sizes of casings and tubings conventionally used for completing wells. The actual diameter of the separator and its vertical height will depend on the amount of crude oil to be separated and the likely relative amounts of oil and gas. The diameter and depth should, obviously, be such, in relation to the crude oil input, as to give a residence time within the separator long enough for adequate separation of the phases.

Some pressure reduction from the crude oil inlet pressure may be required to encourage separation and this can be monitored and controlled by suitable valves in the separator head.

FIG. 2 is an enlargement of FIG. 1 near the base of the separator and shows a pump and pump drive tubing in place. FIG. 2 shows tubing 20 with its enlargement 21 and neck 22. Also shown is separator outer casing 11. Tubing 18 and 19 of FIG. 1 stops short of the pump area of the separator and so is not shown.

Within central passage 25 of the inner tubing, a pump assembly is lowered and landed. This assembly consists of from top to bottom, a drive tube 26, coupling 27, upper data sub 28, coupling 29, electric motor 30, coupling 31, pump unit 32, coupling 33, lower data sub 34, coupling 35 and pump stinger 36 with shoulder stop 37. An armoured communication cable 38 runs up from the lower data sub 34 into the electric motor 30 and there is another internal communication cable (not shown) between the upper data sub 28 and the electric motor.

The inlet to the pump unit 32 is through the pump stinger 36 and up through the other components between the stinger and the pump. This inlet 39 is indicated by dotted lines. The pump outlet is through holes 40 on the top of the pump casing.

To run and land the pump assembly the components may be assembled on a surface vessel and attached to a first length of pump drive tubing. Further sections of drive tubing are added as the assembly is lowered. When the length of drive tubing is sufficient for the depth of the separator, the whole assembly can be lowered by wires, or at the end of a drill string using a releasable tool. Entry of the assembly into the inner tubing 18,19 can be assisted by a ROV and running is continued until the stinger 36 reaches the neck 22. Shoulder stop 37 can be used as a space out stop preventing the stinger 36 passing right through the neck 22. The tubing pump and stinger are measured out to ensure that stinger 36 is in place midway into the neck 22.

The drive tubing pipe 26 is preferably formed of sections of rigid piping enclosing electrical power cables and electrical instrumentation cables. A particularly suitable type of drive pipe is described in UK Patent Application No. 8707308.

Alternatively with an electric pump, the pump could be run on a cable. The pump stinger would be stabbed and locked in the neck 22 and the cable hung off at the top of the separator. This system would be easier to run but the cable would be in the oil production flow and thus liable to corrosion or erosion.

Although an electric motor is shown for the pump, a pump driven by hydraulic power could be used, in which case drive tubing 26 would be a conduit for the hydraulic fluid with electrical instrumentation cables strapped to the outside.

In FIG. 2 are arrows showing the oil flow. Taking FIGS. 1 and 2 together, the overall flow is as follows.

Crude oil is fed into the top of the separator into one or other of the annuli 23 or 24. If possible it is fed in tangentially to give a vortex effect which will assist the separation. As the crude oil flows down the annulus, gas may begin to separate but it will have no outlet until the crude oil reaches the level of the bottom of outer tubing 19. Then any separated gas will be free to flow up the other annulus. The crude oil will have a residence time at the base of the separator below the bottom of outer tubing 19, when further gas will separate and flow up the free annulus. Crude oil flows down to the base of the separator (see arrows FIG. 2) and is sucked by the pump into inlet 39, and pumped out through outlets 40 up the central passage 25.

The upper and lower data subs 28 and 34 contain instruments for monitoring the conditions in the separator and controls which can inform the control unit and can co-ordinate the inflow and outflow through chokes and flow control valves (not shown). The instruments can measure the pressures upstream and downstream of the pump and hence the pressure drop, the possible flow rate of oil out and temperatures. The flows can thus be maintained at their optima to give adequate separation.

The crude oil can be fed into the separator head and the oil and gas dispatched from it in any convenient manner depending on which particular type of sea bed or platform facilities the separator is associated with. FIG. 3 shows the separator head and the above sea bed equipment when the separator forms part of a sea bed process complex as described in UK Patent Application No. 8707307.

In FIG. 3 the separator head is as described in FIG. 1 with the same reference numerals. Above the head and retained on and within a template is an oil production module. Reference is made to UK Patent Application No. 8707307 for details of this type of module which forms part of the sea bed complex. For the purposes of the present invention, the units of the sea bed complex are as follows: Surrounding separator head 13 and extending into the plane of the paper is an oil production piping bar 41 with an oil despatch pipe 42. Above separator head 13 is a piping cross bar 43, above that a pump head module 44 and above that a pump head cap 45. There are upward extensions of the casing and tubing hangers in the separator so that central passage 25 extends up as far as the pump head module. Oil which is pumped up this central passage can then be despatched through oil production outlet pipe 46. This pipe 46 runs through other parts of the complex and eventually into oil production despatch pipe 42. Within central passage 25, the pump drive tubing 26 extends right up to the pump head cap 45 where it is supplied with electric current to drive the pump and where any pump controls are situated. The two annuli 23, 24 of the separator are extended up to the piping cross bar 43. In this example, the inner annulus 24 is in connection with a crude oil inlet pipe 47 and the outer annulus 23 is in connection with a gas production outlet pipe 48. These connections could be reversed, i.e. the crude oil could be directed down the outer annulus with gas flowing up the inner annulus. The crude oil inlet pipe 47 is carried by cross bar 43 to a well module of the seabed complex so that the separator is directly linked to a producing well head. The gas production outlet pipe 48 is carried by the cross bar 43 to a gas production module of the sea bed complex for eventual despatch through a gas production piping bar (not shown) similar to oil production piping bar 41.

The seabed complex of FIG. 3 may include a safety system so that if for any reason, an insufficient inflow of crude occurs, oil from an oil outlet line 46 can be dumped via a dump valve (not shown) and piping back into crude oil annulus 24. This prevents the pump running dry and burning up.

FIG. 4 shows an alternative form of separator which allows the crude oil to flow down the outer annulus 24 and the gas up the inner annulus 23. The main components are the same as for the separator of FIG. 1 and have the same numerals. To enhance the separation, however, two additional components have been incorporated, viz a cyclone and helical casing inserts.

Thus the separator is within conductor casing 5 which has shoe 6 and cement plug 7 at its base. The separator itself has outer casing 11 with casing sump 12, inner casing 18 and central tubing 20. Tubing 20 has an enlargement 21 for a pump and a neck 22 for a pump support. As in FIG. 1, the separator thus has two annuli 23, 24 and a central passage 25.

The separator is supported in the same way as the separator of FIG. 1 on template framework 4, housing 8 and well head 13.

In FIG. 4, the outer annulus 23 is relatively wide and receives crude oil at its top, fed in tangentially to a cone 49 forming part of a cyclone. (This part of the separator is shown in more detail in FIG. 6). Within annulus 23 are three helices 50 shown in more detail in FIG. 5. The cone and helices act as cyclones so that the crude oil descends as a vortex. Separated gas is free to enter inner annulus 24 through holes 51 (see FIG. 5).

Near the base of the separator is a fourth helix 52 surrounding the pump 21. This helix differs from the other three helices in that is has a casing 53 with a conical open base 54 acting as a sand debris trap. Any sand or mineral debris in the crude oil can drop through the open base to form a pile 55 in the casing sump. This sand can be removed when the pump is pulled for servicing by inserting narrow tubing into the production tubing 20 and sucking up the sand.

The flow of crude oil down outer annulus 23 is indicated by arrows. The vortex initially formed in cone 49 is sustained by helices 50. Separated gas can pass into inner annulus 24 through holes 51. In helix 52 crude oil enters the central tube through its base and hence to the pump in the same way as in FIG. 1. The preferred oil level is indicated at 84 just above helix 52.

FIG. 5 shows a helix 50. It has a central tube 85 with an internal screw thread 86 at the top and an external screw thread 87 at the bottom so that a number of helices screwed together can form casing 18 of the separator. Holes 51 form passages for gas to pass from outer annulus 23 to inner annulus 24. Surrounding tube 85 is a cylinder with top and bottom portions 56, 57 and with the middle portion cut to form one or more helical strips. Two are shown at 59. The strips form a tight helix at the top and a more gradual helix at the bottom. At the base of the cylinder, gas can pass into central tube 85 through gas catcher skirt 60, as well as through holes 51.

From FIGS. 4 and 5, it will be seen that the initial crude oil vortex is given further tangential impetus by the tight coils of the top of each helix so that the vortex is sustained throughout the length of the downward travel of the crude oil. The quieter regions at the bottom of each helix encourage gas separation and accelerate the oil flow prior to entering the next section.

As explained in FIG. 1 instruments associated with the pump can monitor the flows into and through the separator with the aim that substantially all the gas is separated by the helices 50, the degassed oil level being kept just above the pump at the top of helix 52, which acts primarily to separate sand.

FIG. 6 shows a separator head which could be used with the separator of FIG. 4 or which could be used with any other form of separator, e.g. a "stand alone" separator linked to a number of cluster wells. The external conductor 5 and the separator itself are set into template framework 4 in a similar way to the separator of FIG. 1 using housing 8 and lockdown ring 9 and for the conductor, and lockdown ring 14 within housing 8 for holding housing 61 at the base of which is separator external casing 11. A connector 62 seats on top of housing 61 to support the top part of the separator. The Figure shows outer tubing 18 and inner tubing 20 forming, with housing 61, annuli 23 and 24 and central passage 25. Within central passage is the pump drive string 26 extending up to pump head housing 73, pump head connector 63 and pump head 64 with an electrical power cable 65. Connector override 66 on top of the pump head connector 63 allows the connector to be freed and removed by an ROV if required. The pump drive string 26 and pump itself can thus be withdrawn for repair or replacement.

Crude oil is fed into the top of the separator tangentially through inlet 47, the flow being controlled by choke 67. The crude oil enters a cyclone 68 supported by housing 69. Cyclone 68 has a cylindrical top portion 70 and lower conical portion 49. The arrows indicate the flow of the crude oil through the cyclone as a descending vortex passing into outer annulus 23 of the separator. Gas separated in this initial cyclone can pass into inner annulus 24 through a circular gap 71 within a wear sleeve of cylinder 70 and through an annular port 72 at the top of the separator proper. Further separation occurs in the separator as described with reference to FIG. 4.

Gas outlet 48 at the top of inner annulus 24 has a filter 74 and oil drip holes 75 so that any entrained oil can return to cylinder 70. The gas outlet may have a flow control valve 76.

Produced oil outlets 46 are in the pump head housing 73. There is a connection 77 between the produced oil outlet 46 and crude oil inlet 47 with a flow control valve 83. As in FIG. 4, this allows produced oil to be recycled to the separator in the event of any malfunction, so that the pump does not run dry.

At the top of the assembly is lifting mandrel 78 by means of which the whole of the separator head can be unlocked and withdrawn. It will be see that cyclone 68 is, in fact, formed in two parts with cylinder 68 separate from cone 49. Cone 49 is, in effect, a hanger held within housing 61 by step 79. A subsea module interface is used between the two parts and a test and monitoring port 80 is produced at the junction. Ring seals 81 above and below the junction ensure that it is fluid tight. There is a further test and monitoring port 82 in pump head connector 63.

We claim:

1. A vertical separator capable of separating crude oil from an underwater well into liquid and gas phases comprising;
   (i) an outer casing forming the outer shell of the separator,
   (ii) two sets of concentric tubing within the outer casing, giving with the outer casing, two annuli and a central passage, one annulus having an inlet to receive crude oil, the other annulus having an outlet for separated gas and the central passage having an outlet for product oil, and
   (iii) an electrical or hydraulic pump at the base of the central passage, and a pump drive pipe extending from the pump up within the central passage to a source of power supplied to the top of the separator, and
   (iv) said crude oil inlet and outlets for separated gas and product oil all being at the top of the separator, and
   (v) said vertical separator being itself underwater extending at least partially into a sea-bed and having an external casing, outside the separator outer casing, said external casing being cemented into the sea-bed.

2. A vertical separator as claimed in claim 1 wherein the crude oil annulus has means for applying a swirling motion to the crude oil.

3. A vertical separator as claimed in claim 2 wherein said means is at least one helix in the crude oil annulus.

4. A vertical separator as claimed in claim 3 wherein at least one helix is of varying pitch along its length.

5. A vertical separator as claimed in claim 2 wherein said means is a tangential inlet for the crude oil into the annulus and/or a cyclone within the annulus.

6. A vertical separator as claimed in claim 1 wherein a pipe having a valve within it connects the outlet for product oil with the inlet for crude oil, said valve being normally closed but which when opened directs product oil to the crude oil inlet for recycling to the separator.

* * * * *